(12) United States Patent
Satish (10) Patent No.: US 9,075,989 B2
(45) Date of Patent: Jul. 7, 2015

(54) IDENTIFYING MISUSE OF LEGITIMATE OBJECTS

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 36 days.

(21) Appl. No.: 13/940,106

(22) Filed: Jul. 11, 2013

(65) Prior Publication Data

US 2015/0020197 A1    Jan. 15, 2015

(51) Int. Cl.
| | |
|---|---|
| *G06F 21/00* | (2013.01) |
| *G06F 21/55* | (2013.01) |
| *G06F 21/56* | (2013.01) |
| *G06F 21/50* | (2013.01) |
| *H04L 29/06* | (2006.01) |

(52) U.S. Cl.
CPC ............. *G06F 21/55* (2013.01); *H04L 63/1416* (2013.01); *G06F 21/56* (2013.01); *G06F 21/50* (2013.01)

(58) Field of Classification Search
CPC ...... G06F 21/50; G06F 21/56; H04L 63/1416
USPC ................................. 726/23, 25, 26; 717/120
See application file for complete search history.

(56) References Cited

U.S. PATENT DOCUMENTS

| | | | |
|---|---|---|---|
| 2010/0100963 A1* | 4/2010 | Mahaffey | 726/25 |
| 2011/0047597 A1* | 2/2011 | Mahaffey et al. | 726/3 |
| 2011/0179484 A1 | 7/2011 | Tuvell et al. | |
| 2013/0097699 A1 | 4/2013 | Balupari et al. | |
| 2013/0111591 A1 | 5/2013 | Topan et al. | |
| 2013/0326476 A1* | 12/2013 | Wyatt et al. | 717/120 |
| 2013/0326477 A1* | 12/2013 | Wyatt et al. | 717/120 |

FOREIGN PATENT DOCUMENTS

WO    WO 2012/023657 A1    2/2012

OTHER PUBLICATIONS

PCT International Search Report and Written Opinion, PCT Application No. PCT/US2014/045136, Oct. 22, 2014, 10 pages.

* cited by examiner

*Primary Examiner* — Syed Zaidi
(74) *Attorney, Agent, or Firm* — Fenwick & West LLP (57) ABSTRACT

A query is received from a client device regarding an object. The query includes an identifier of the object and a set of associated usage attributes describing a usage of the object on the client device. A set of usage facts associated with the identified object is identified. The set of usage facts describe typical usages of the object on a plurality of client devices. A determination is made whether the usage of the object on the client device is suspicious based on the set of usage facts associated with the object and the set of usage attributes included in the query. A report is provided to the client device based on the determination.

18 Claims, 4 Drawing Sheets

IDENTIFYING MISUSE OF LEGITIMATE OBJECTS

BACKGROUND

1. Technical Field

The following disclosure pertains in general to computer security and particularly to identifying suspicious usage of legitimate objects.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can stealthily capture important information such as logins, passwords, bank account identifiers, and credit card numbers. Similarly, the malware can provide hidden interfaces that allow the attacker to access and control the compromised computer.

Signatures can be used to detect some types of malware. Malware signatures describe characteristics of known malware, such as data strings found in the malware or known malicious behaviors, and are used to determine whether an object on a computer contains malware. Typically, a set of malware signatures is generated by a provider of security software and is deployed to security software on a user's computer. This set of malware signatures is then used by the security software to detect malware on the user's computer.

However, the security software can fail to detect certain types of malware. For example, attackers are now carrying out attacks using objects trusted as legitimate (i.e., non-malicious) by the security software. The malware signatures do not detect that the trusted objects are being used for malicious purposes. Therefore, the security software does not detect the attack.

BRIEF SUMMARY

The above and other issues are addressed by a computer-implemented method, a computer program product, and a computer system for identifying suspicious usage of an object. An embodiment of the computer-implemented method comprises receiving a query from a client device regarding an object. The query includes an identifier of the object and a set of associated usage attributes describing a usage of the object on the client device. A set of usage facts associated with the identified object is identified. The set of usage facts describe typical usages of the object on a plurality of client devices. A determination is made whether the usage of the object on the client device is suspicious based on the set of usage facts associated with the object and the set of usage attributes included in the query. A report is provided to the client device based on the determination.

An embodiment of the computer program product comprises a non-transitory computer-readable storage medium including executable code. The code when executed performs steps. The steps include receiving a query from a client device regarding an object. The query includes an identifier of the object and a set of associated usage attributes describing a usage of the object on the client device. The steps further include identifying a set of usage facts associated with the identified object. The set of usage facts describe typical usages of the object on a plurality of client devices. The steps also include determining whether the usage of the object on the client device is suspicious based on the set of usage facts associated with the object and the set of usage attributes included in the query. A report is provided to the client device based on the determination.

An embodiment of the computer system comprises a processor and a computer-readable storage medium including executable code. The code when executed by the processor performs steps comprising receiving a query from a client device regarding an object. The query includes an identifier of the object and a set of associated usage attributes describing a usage of the object on the client device. The steps further include identifying a set of usage facts associated with the identified object. The set of usage facts describe typical usages of the object on a plurality of client devices. The steps also include determining whether the usage of the object on the client device is suspicious based on the set of usage facts associated with the object and the set of usage attributes included in the query. A report is provided to the client device based on the determination.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
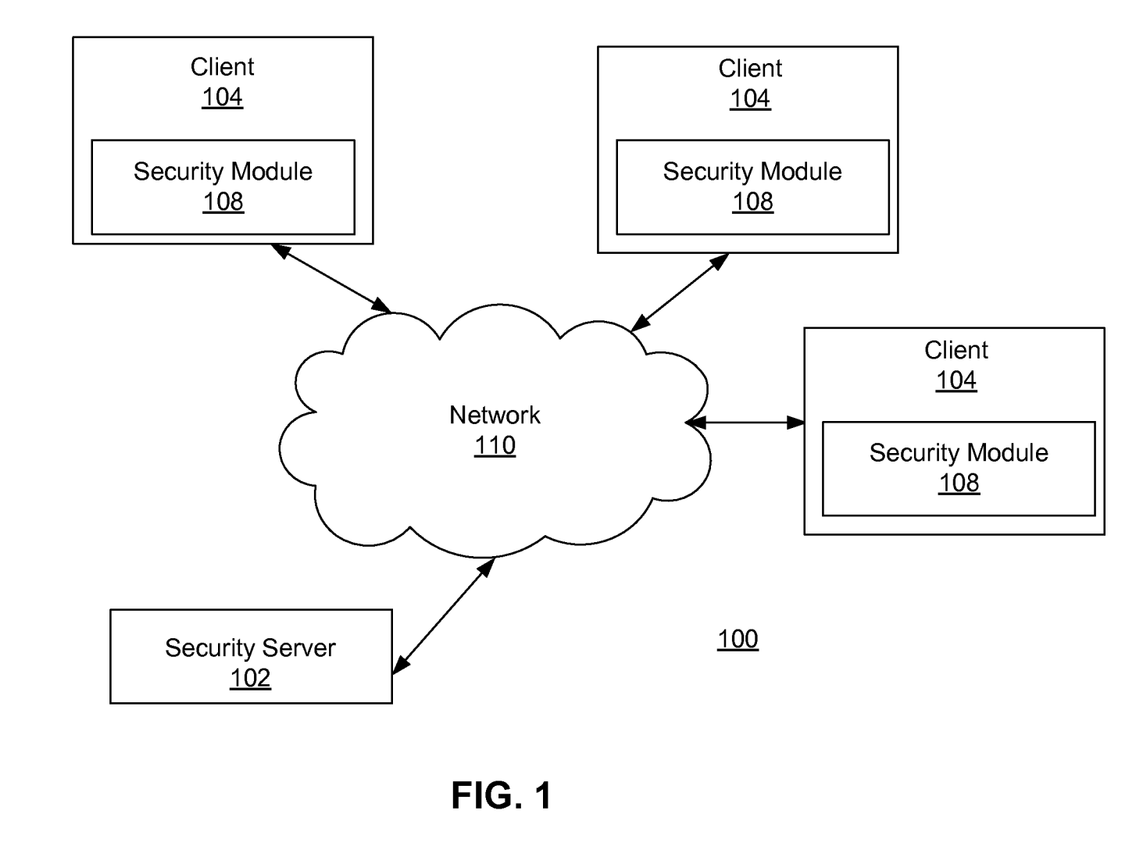
FIG. 1 is a high-level block diagram of a computing environment according to one embodiment.

FIG. 1 is a high-level block diagram of a computing environment 100 according to one embodiment. FIG. 1 illustrates a security server 102 and three clients 104 connected by a network 110. Only three clients 104 are illustrated in FIG. 1 in order to simplify and clarify the description. Embodiments of the computing environment 100 can have thousands or millions of clients 104. Some embodiments also have multiple security servers 102.

In one embodiment, the clients 104 are electronic devices. A client 104 may be a conventional computer system executing, for example, a MICROSOFT WINDOWS compatible operating system (OS), APPLE OS X, and/or a LINUX distribution. A client 104 can also be another device having computer functionality, such as a tablet computer, mobile telephone, video game system, etc.

A client 104 typically stores and interacts with numerous objects of different types. These objects may include files installed on the client's storage device or downloaded from a remote server via the network 110, uniform resource locators (URLs) of locations (e.g., websites) accessed by a browser or other application executing on the client, processes held in memory of the client, etc. Some objects are trusted by a security module 108 executing on the client 104 as being legitimate (i.e., not malicious). For examples, files that are well-known components of an operating system are often trusted as being legitimate. Likewise, websites of known reputable entities may be trusted. Files downloaded from trusted websites may also be trusted as legitimate, due to the trust of the entities operating the websites. Additionally, files that are digitally signed by known trustworthy entities may be trusted.

Other objects are not trusted as being legitimate. Such untrusted objects may host malicious software. Malicious software, sometimes called "malware," is generally defined as software that executes on a client 104 surreptitiously or that has some surreptitious functionality. Objects that host malicious software are known as malware objects.

A malware object can use a trusted legitimate object to attack the client 104. For example, a malware object might download a trusted file transfer program, such as the tftp.exe client available from MICROSOFT CORP. to the client 104. The malware may then use the file transfer program to exfiltrate (i.e., release) confidential data from the client 104. That is, attackers may use malware that exploits trusted objects to expose data on the client 104 and thereby compromise the client 104 and/or the user of the client.

The client 104 executes a security module 108 for providing security to the client. In one embodiment, the security module 108 detects the presence of malware on the client 104, including malware that is exploiting trusted objects to attack the client. The security module 108 can be incorporated into the OS of a client 104 or part of a separate comprehensive security package. In one embodiment, the security module 108 is provided by the same entity that operates the security server 102.

The security module 108 may detect malware using a variety of different techniques. In one embodiment, the security module 108 detects malware using detection data including malware signatures. A malware signature describes characteristics of malware that can be used to detect an instance of a malware object at the client 104. The characteristics may include a string signature that identifies a sequence of data found in objects that indicate the presence of the malware and a sequence of behaviors that are performed by the malware when executing at the client 104.

Another technique used by the security module 108 to detect malware involves communicating with the security server 102 via the network 110 to obtain information about the object. In one embodiment, the security module 108 detects when an object on the client 104 is being used (e.g., when an action is performed on the client that involves the object). For example, the security module 108 may observe when a particular file on the client 104 is created, accessed, modified, executed, or transmitted via the network 110. The security module 108 creates a fingerprint (i.e., an identifier) that uniquely identifies the object using hashing or another computational technique. The security module 108 then provides the fingerprint of the object to the security server 102 as part of a query seeking information about the object.

In one embodiment, the security module 108 also identifies (i.e., collects) usage attributes associated with the object and sends these attributes to the security server 102 along with the object's fingerprint. The security module 108 may send the usage attributes to the security server 102 as part of the query for information about the object, or as a separate transaction. A usage attribute of an object describes a characteristic of the usage of the object. Thus, the usage attributes collectively describe how the object is being used at the client 104. In one embodiment, the attributes of an object depend on the type of object, and different types of objects have different sets of attributes. For example, the types of objects may include file objects and URL objects. The set of attributes for a file object may include a name of the file, a file path describing the location of the file at the client 104, a URL or domain associated with the file, a creator of the file, and an identifier of the process that is accessing the file. For a URL object, the set of attributes may include the type of usage of the URL (e.g., web browsing or downloading a file) and an application used to access the URL. A given object may not have a value for each attribute in its corresponding set. For example, a file object may not have a value for the URL/domain attribute if the file was not downloaded from a website.

The security module 108 transmits the identified usage attributes to the security server along with the fingerprint of the associated object. In response to the query, the security module 108 receives information about the object from the security server 102. In one embodiment, the information indicates whether the usage of the object is suspicious or non-suspicious. The information from the security server 102 may also include other information, such as reputation information indicating the likelihood that the object contains malware, with a very high reputation indicating that the object is unlikely to contain malware and a very low reputation indicating that the object is likely to contain malware.

If the information from the security server 102 indicates that the usage of the object is non-suspicious, the security module 108 allows the usage to occur on the client 104. If the information indicates that the usage of the object is suspicious, the security module 108 may perform a security action. The types of security actions may vary in different embodiments. One security action that may be performed is blocking the suspicious usage of the object. For example, the security module 108 may block an attempt by a process to use the object to send data out of the client 104. Another security action is providing a report (e.g., a warning) to the user of the client 104 that the usage of the object is suspicious. The user can then decide whether to allow or deny the usage based on the warning. A third security action the security module 108 may perform is quarantining the usage to allow it to occur without harming the client 104. For example, the security module 108 may virtualize inputs and outputs from the object, thereby limiting the damage the usage of the object can cause on the client 104. In particular, the security module 108 may restrict read and write capabilities to certain system locations on the client 104 and/or limit privileges of the object with respect to the client.

In one embodiment, the security module 108 collects and sends usage attributes for only certain types of objects at the client 104, such as for only objects trusted as legitimate. This way, the security module 108 detects when legitimate objects are being used for suspicious purposes. Embodiments of the security module 108 may also use this technique for objects not trusted as legitimate. In addition, the security module 108 may use other malware detection techniques in addition to the techniques described herein.

The security server 102 is a hardware device and/or software module configured to receive queries about objects from clients 104 or other entities and provide information in response. An example of the security server 102 is a web-based system providing security software and services to the security modules 108 of the clients 104. Depending on the embodiment, one or more of the functions of the security server 102 can be provided by a cloud computing environment. As used herein, "cloud computing" refers to a style of computing in which dynamically scalable and often virtualized resources are provided as a service over the network 110. Functions attributed to the clients 104 and production security modules 108 can also be provided by the cloud computing environment.

The security server 102 provides a response to a query classifying the usage of an object as suspicious or non-suspicious. The security server 102 classifies the usage based at least in part on the usage attributes included in the query. In one embodiment, the security server 102 classifies the usage of an object by identifying a set of facts describing usage attributes consistent with typical usage of the object by the clients 104 that are in communication with the security server 102. The security server 102 compares the set of facts associated with the object with the usage attributes included in the query to determine whether the usage of the object is typical. If the usage of the object is typical, the security server 102 classifies the usage as non-suspicious. If the queried-for usage is not typical, in contrast, the security server 102 classifies the usage as suspicious.

The network 110 represents the communication pathways between the security server 102, clients 104, and any other entities on the network. In one embodiment, the network 110 is the Internet and uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
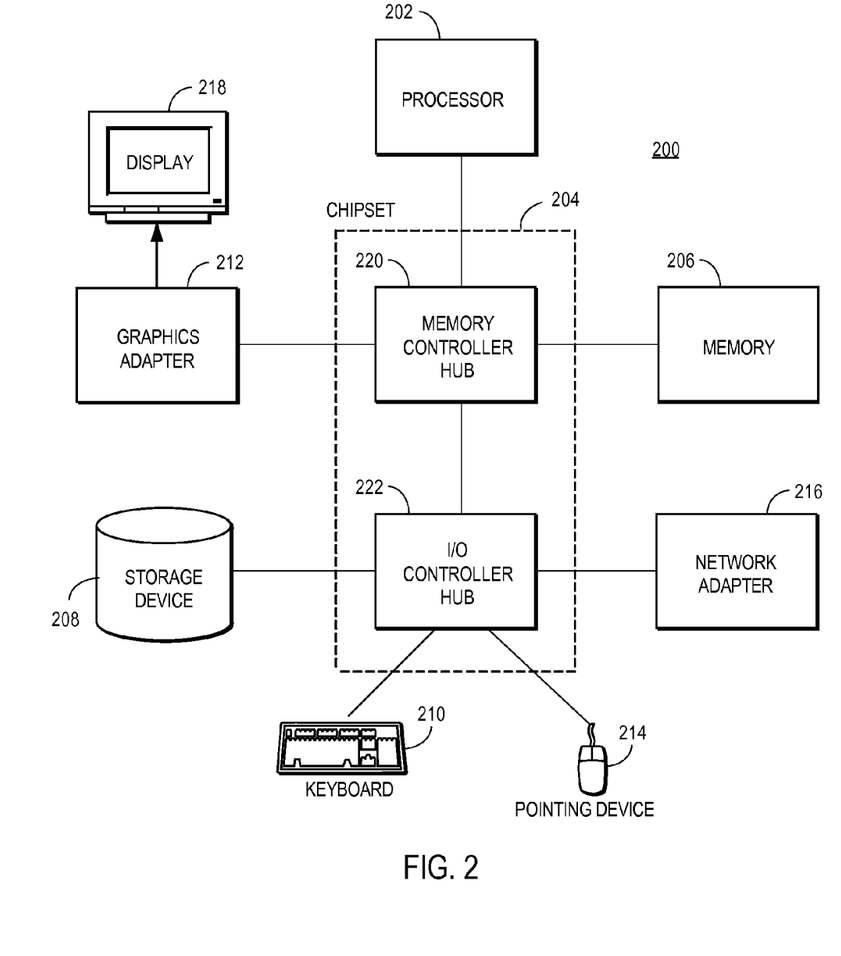
FIG. 2 is a high-level block diagram illustrating a typical computer for use as a security server or client according to one embodiment.

FIG. 2 is a high-level block diagram illustrating a typical computer 200 for use as a security server 102 or client 104. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 110.

As is known in the art, a computer 200 can have different and/or other components than those shown in FIG. 2. In addition, the computer 200 can lack certain illustrated components. In one embodiment, a computer 200 acting as a security server is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

This description uses the term "module" to refer to computer program logic for providing a specified functionality. A module can be implemented in hardware, firmware, and/or software. A module is typically stored on a non-transitory computer-readable storage medium such as the storage device 208, loaded into the memory 206, and executed by the processor 202.

Figure 3:
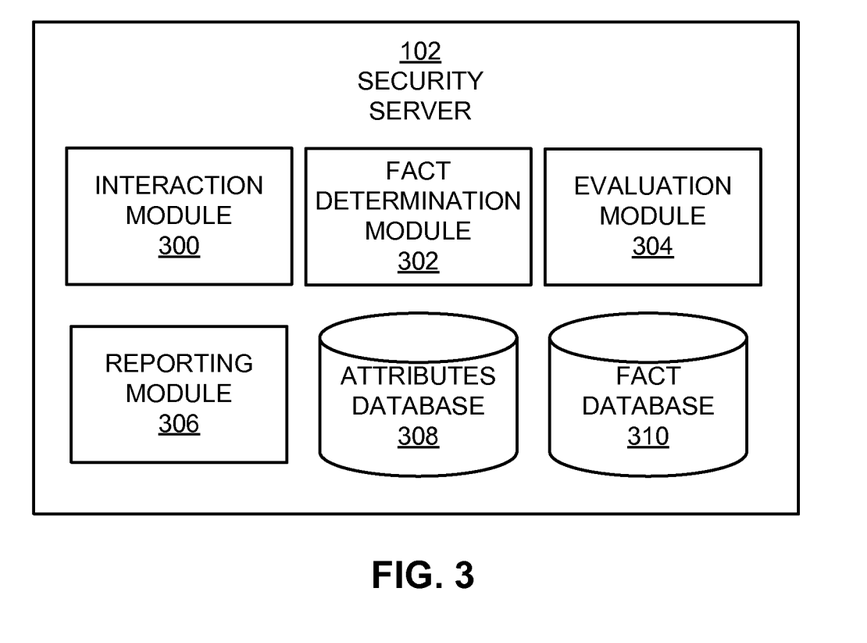
FIG. 3 is a high-level block diagram illustrating a detailed view of the security server according to one embodiment.

FIG. 3 is a high-level block diagram illustrating a detailed view of the security server 102 according to one embodiment. As shown in FIG. 3, the security server 102 includes multiple modules. In some embodiments, the functions are distributed among these modules in a different manner than described herein.

An interaction module 300 receives queries from clients 104 and provides responses to the queries to the clients. As mentioned above, in one embodiment a query from a client 104 includes a fingerprint identifying an object being used by the client and usage attributes describing how the object is being used. The identified object may be trusted by the client 104 as legitimate. A response to the query, in turn, classifies the usage of the identified object as suspicious or non-suspicious. In one embodiment, the response explicitly indicates the classification of the usage. In another embodiment, the response includes information that the client 104 may then use to classify the object. The interaction module 300 communicates with the other modules within the security server 102 to share the received queries and obtain the information to provide in response to the queries.

The interaction module 300 stores usage attributes received from the clients 104 in an attributes database 308. The attributes database 308, in turn, stores the attributes in association with the attributes' respective objects. Thus, for a given object, the attributes database 308 stores usage attributes received from multiple different clients 104 for that object. In an environment 100 having many clients 104, the attributes database 308 will over time store identifiers of many different objects used by the clients and even more sets of usage attributes describing how the clients used the objects. In addition, the usage attributes for a given object may be retrieved from the attributes database 308 by using the fingerprint of the object as a key.

A fact determination module 302 analyzes the attributes in the attributes database 308 to establish facts describing typical usages of the objects by the clients 104. To establish a set of facts for an object, the fact determination module 302 identifies the set of usage attributes associated with the object from the attributes database 308. For example, the fact determination module 302 may query the attributes database 308 for the set of usage attributes stored in association with a given object's fingerprint.

The fact determination module 302 analyzes the identified set of usage attributes associated with the object to identify the most common attribute values for the object. Since the usage attributes were received from multiple clients 104, the most common attribute values represent the typical usage of the associated object by the clients in communication with the security server 102. These most common attribute values are referred to as "facts" about the usage of the object. The fact determination module 302 thus determines a set of facts about the usage of an object.

To identify the set of facts, the fact determination module 302 determines the type of the object. The fact determination module 302 then enumerates the different attributes associated with that object type. For example, as described above a file object may have a set of attributes including a name of the file, a file path describing the location of the file at the client 104, a URL or domain associated with the file, a creator of the file, and an identifier of the process that is accessing the file. The fact determination module 302 determines the most common values for each usage attribute for the object, e.g., the most common locations of the file at the clients.

The fact determination module 302 may determine the most common values of the attributes using one or more of a variety of techniques. In one embodiment, the fact determination module 302 identifies the most frequently-occurring values (e.g., the top five) for each attribute in the set. The fact determination module 302 may perform this analysis by creating a histogram describing the frequency of occurrence of values for the attributes. For example, the fact determination module 302 may identify the top five most frequent names for the object, the top five most frequent file paths associated with the file, the top five most frequent URLs or domains associated with the file, etc.

The fact determination module 302 updates the sets of facts for the objects over time, as new usage attributes are received from clients 104. In one embodiment, the sets of facts for the objects are updated on a periodic basis. For example, the fact determination module 302 may update the sets of facts on a daily, weekly, monthly, or bi-monthly basis. Updating the sets of facts in this manner ensures that the sets of facts associated with the objects are current, and reflect how the objects are currently being used by the clients 104.

The fact determination module 302 stores the determined usage facts in a fact database 310. Similar to the attribute database 308, an embodiment of the fact database 310 stores the facts in association with object fingerprints. Thus, the set of usage facts for a given object may be determined by querying the fact database 310 using the fingerprint of the object as a key.

An evaluation module 304 evaluates usages of objects to determine whether the usages are suspicious. In one embodiment, the evaluation module 304 receives a query from a client 104 including a fingerprint identifying an object being used by the client and usage attributes describing how the object is being used at the client. For example, the set of attributes for the object may include the file name value "1256.scu," a file path value indicating that the object is located in the Recycle Bin of the client 104, an associated URL value "mypayloadserver.cn," an indication that the file was created from an INTERNET EXPLORER download, and an indication that ACROBAT READER is the process accessing the file.

Responsive to receiving the query, evaluation module 304 analyzes the set of attributes of the object to determine whether the client's usage of the object is suspicious. As part of this analysis, the evaluation module 304 accesses the fact database 310 to identify the set of usage facts associated with the identified object. Continuing the example described above, the evaluation module 304 may determine that the set of facts indicate that the name of the object is commonly "tftp.exe" and has a common file path of "C:\Windows\System32."

The evaluation module 304 compares the identified set of usage facts with the set of usage attributes to determine an amount of variance, if any, between the usage attributes received from the client 104 and the set of facts retrieved from the fact database 310. This comparison may be performed by comparing the value of each attribute with the values of the corresponding fact. For example, the evaluation module 304 may determine whether the name of the file, "1256.scu," appears in the list of top five names for the file indicated by the corresponding fact. If the name does appear in the list of names, then the name attribute is said to match the corresponding name fact. The evaluation module 304 performs a similar determination for each of the usage attributes of the object. These comparisons therefore indicate how many usage attributes in the set match the corresponding facts for the object maintained by the fact database 310.

The evaluation module 304 may classify the usage of the object as suspicious based on the comparison. In one embodiment, the evaluation module 304 classifies the usage of the object suspicious if a threshold number of usage attributes do not match the corresponding usage facts for the object. If the evaluation module 304 determines that a threshold number of usage attributes do match with the corresponding usage facts for the object, the evaluation module 304 classifies the usage of the object as non-suspicious. Thus, by comparing the attributes of an object with the facts associated with the object, the evaluation module 304 determines whether the object is being used by the client 104 in a suspicious manner.

The threshold may be established based on the number of attributes (e.g., suspicious if at least three attributes do not match), based on a percentage of matching attributes (e.g., suspicious if at least 30% of the attributes do not match), or based on another technique. In one embodiment, the evaluation module 304 assigns different weights to different usage attributes, so that some attributes have greater and lesser influence on whether the threshold is met. Other embodiments of the evaluation module 304 use different techniques to determine whether the usage of the object is suspicious.

A reporting module 306 reports the results of evaluations made by the evaluation module 304 to the clients 104. The reporting module 306 formulates a response to a query from a client 104 and provides the response to the interaction module 300 for transmission to the client. In one embodiment, the response indicates whether the evaluation module 304 classified the usage of identified object as suspicious or non-suspicious. The security module 108 of the client 104 may then perform a security action based on the classification in the response. The reporting module 306 may specify a security action for the security module 108 to perform, or the security module 108 may determine the appropriate security action. In another embodiment, the reporting module 306 includes facts about the object from the fact database 310 in the response, and may omit the result of the evaluation made by the evaluation module 304). The security module 108 of the client 104 may then evaluate the facts in view of the usage attributes of the object at the client, and make a local classification of the usage as suspicious or non-suspicious and an appropriate security action.

Further, the reporting module 306 may perform other actions based on the results of evaluations made by the evaluation module 304. For example, the reporting module 306 may alter the reputation of an object based on the evaluation. If an object trusted as legitimate is frequently used in suspicious ways across clients 104, the reporting module 306 may lower the reputation of the object to indicate that it is no longer trusted. As a result, security modules 108 of the clients 104 may give the object higher scrutiny and therefore improve the detection of malware using the object.

Figure 4:
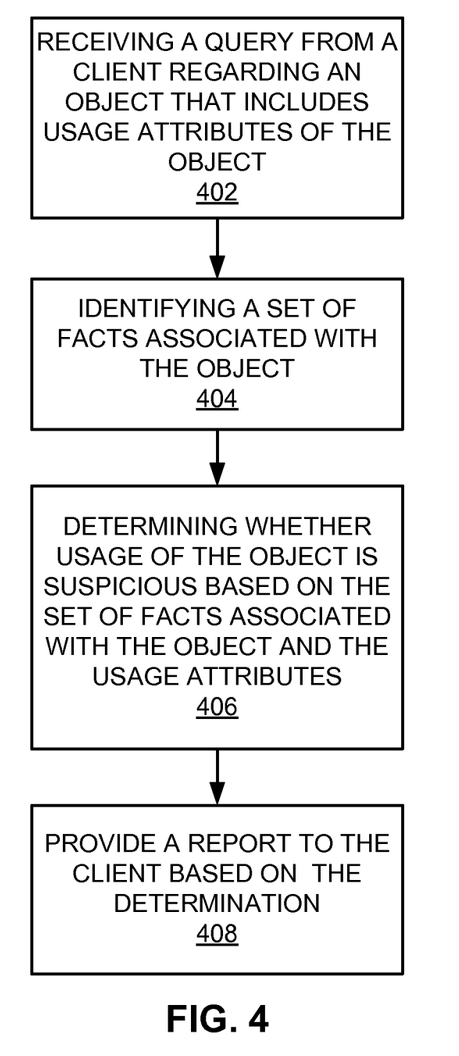
FIG. 4 is a flow chart illustrating steps performed by the security server to identify suspicious usage of a legitimate object according to one embodiment.

FIG. 4 is a flow chart illustrating steps performed by one embodiment of the security server 102 to identify suspicious usage of an object. Other embodiments can perform different and/or additional steps. Moreover, other embodiments can perform the steps in different orders. Further, some or all of the steps can be performed by entities other than the security server 102.

In one embodiment, the security server 102 receives 402 a query from a client 104 regarding an object. The query includes usage attributes of the object such as the name of the file, the file path describing the location of the file at the client 104, the URL or domain associated with the file, the creator of the file, and an identifier of the process that is accessing the file. The security server 102 identifies 404 a set of facts associated with the object. The set of facts describe usage attributes consistent with typical usage of the object. The security server 102 determines 406 whether the usage of the object is suspicious based on the set of facts associated with the object and the corresponding usage attributes. The security server 102 provides 408 a report to the client 104 based on the determination.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A computer-implemented method of identifying suspicious usage of an object, the method comprising:
   receiving a query from a client device regarding an object trusted as non-malicious by a security module executing on the client device, the query including an identifier of the object and a set of usage attributes describing a usage of the object on the client device;
   identifying a set of usage facts associated with the identified object, the set of usage facts describing typical usages of the identified object on a plurality of client devices;
   comparing, by a computer, the set of usage facts associated with the identified object and the set of usage attributes included in the query from the client device;
   determining, responsive to the comparing, whether at least a threshold number of usage attributes from the set of usage attributes match the set of usage facts associated with the identified object, the determining comprising:
      assigning different weights to ones of the usage attributes included in the set of usage attributes received in the query; and
      determining, responsive to an influence of the assigned weights, whether at least the threshold number of usage attributes from the set of usage attributes match the set of usage facts associated with the identified object;
   responsive to at least a threshold number of usage attributes from the set of usage attributes not matching the set of usage facts associated with the identified object, classifying the usage of the identified object on the client device as suspicious;
   responsive to at least a threshold number of usage attributes from the set of usage attributes matching the set of usage facts associated with the identified object, classifying the usage of the identified object on the client device as non-suspicious; and
   providing a report to the client device including the classification of the usage of the identified object on the client device.

2. The computer-implemented method of claim 1, wherein the identified object is a file stored on the client device and the query is received from the client device responsive to the usage of the identified object on the client device.

3. The computer-implemented method of claim 1, wherein there are a plurality of different object types associated with objects and each object type is associated with a corresponding set of different types of usage facts and wherein identifying the set of usage facts comprises:
   identifying an object type associated with the identified object;
   identifying a set of different types of usage facts corresponding to the identified object type; and
   identifying values for the set of different types of usage facts corresponding to the identified object.

4. The computer-implemented method of claim 3, wherein the object type of the identified object is a file object and identifying the set of different types of usage facts comprises identifying at least one of: a name of the file, a file path describing a location of the file at the client device, a uniform resource locator (URL) associated with the file, a creator of the file, and an identifier of a process that is accessing the file.

5. The computer-implemented method of claim 1, further comprising:
   receiving reports from the plurality of client devices including usage attributes associated with the identified object, the usage attributes describing usage of the identified object on the plurality of client devices;
   analyzing the usage attributes to identify common usage attributes across the plurality of client devices; and
   establishing the set of usage facts associated with the identified object based on the common usage attribute across the plurality of client devices.

6. The computer-implemented method of claim 1, wherein providing the report to the client device comprises:
   specifying a security action for the client device to perform responsive to determining that usage of the identified object is suspicious.

7. The computer-implemented method of claim 1, wherein the security action comprises at least one of: blocking usage of the identified object, providing a warning to a user of the client device that the usage of the identified object is suspicious, and quarantining the usage of the identified object.

8. The computer-implemented method of claim 1, wherein the classification of the usage of the identified object included in the report is either suspicious or non-suspicious based on the comparison.

9. The computer-implemented method of claim 1, wherein providing the report to the client device comprises:
   providing the set of usage facts associated with the identified object to the client device;
   wherein the client device determines whether the usage of the identified object is suspicious based on the received set of usage facts.

10. The computer-implemented method of claim 1, further comprising:
    receiving reports from the plurality of client devices including usage attributes associated with the identified object, the usage attributes describing usage of the identified object on the plurality of client devices; and
    updating the set of usage facts associated with the object over time based on the usage attributes included in the reports.

11. The computer-implemented method of claim 1, wherein the report further includes reputation information associated with the identified object, the reputation information indicating a likelihood that the identified object trusted as non-malicious contains malware and wherein a lower reputation indicates a higher likelihood that the object contains malware.

12. A computer program product comprising a non-transitory computer-readable storage medium including executable code for identifying suspicious usage of an object, the code when executed performs steps comprising:
   receiving a query from a client device regarding an object trusted as non-malicious by a security module executing on the client device, the query including an identifier of the object and a set of usage attributes describing a usage of the object on the client device;

identifying a set of usage facts associated with the identified object, the set of usage facts describing typical usages of the identified object on a plurality of client devices;

comparing, by a computer, the set of usage facts associated with the identified object and the set of usage attributes included in the query;

determining, responsive to the comparing, whether at least a threshold number of usage attributes from the set of usage attributes match the set of usage facts associated with the identified object, the determining comprising:
assigning different weights to ones of the usage attributes included in the set of usage attributes received in the query; and
determining, responsive to an influence of the assigned weights, whether at least the threshold number of usage attributes from the set of usage attributes match the set of usage facts associated with the identified object;

responsive to at least a threshold number of usage attributes from the set of usage attributes not matching the set of usage facts associated with the identified object, classifying the usage of the identified object on the client device as suspicious;

responsive to at least a threshold number of usage attributes from the set of usage attributes matching the set of usage facts associated with the identified object, classifying the usage of the identified object as non-suspicious; and providing a report to the client device including the classification of the usage of the identified object based on the comparison.

13. The computer program product of claim 12, wherein the identified object is a file stored on the client device and the query is received from the client device responsive to the usage of the identified object on the client device.

14. The computer program product of claim 13, wherein providing the report to the client device comprises:
providing the set of usage facts associated with the identified object to the client device;
wherein the client device determines whether the usage of the identified object is suspicious based on the received set of usage facts.

15. The computer program product of claim 12, wherein the classification of the usage of the identified object included in the report is either suspicious or non-suspicious based on the comparison.

16. A computer system for identifying suspicious usage of an object, the computer system comprising:
a processor;
a computer-readable storage medium including executable code, the code when executed by the processor performs steps comprising:
receiving a query from a client device regarding an object trusted as non-malicious by a security module executing on the client device, the query including an identifier of the object and a set of usage attributes describing a usage of the object on the client device;
identifying a set of usage facts associated with the identified object, the set of usage facts describing typical usages of the identified object on a plurality of client devices;
comparing, by a computer, the set of usage facts associated with the identified object and the set of usage attributes included in the query from the client device;
determining, responsive to the comparing, whether at least a threshold number of usage attributes from the set of usage attributes match the set of usage facts associated with the identified object, the determining comprising:
assigning different weights to ones of the usage attributes included in the set of usage attributes received in the query; and
determining, responsive to an influence of the assigned weights, whether at least the threshold number of usage attributes from the set of usage attributes match the set of usage facts associated with the identified object;
responsive to at least a threshold number of usage attributes from the set of usage attributes not matching the set of usage facts associated with the identified object, classifying the usage of the identified object on the client device as suspicious;
responsive to at least a threshold number of usage attributes from the set of usage attributes matching the set of usage facts associated with the identified object, classifying the usage of the identified object on the client device as non-suspicious; and
providing a report to the client device including the classification of the usage of the identified object on the client device.

17. The computer system of claim 16, wherein the classification of the usage of the identified object included in the report is either suspicious or non-suspicious based on the comparison.

18. The computer system of claim 16, wherein providing the report to the client device comprises:
providing the set of usage facts associated with the identified object to the client device;
wherein the client device determines whether the usage of the identified object is suspicious based on the received set of usage facts.

* * * * *